United States Patent [19]

Jacobs et al.

[11] 4,068,131
[45] Jan. 10, 1978

[54] WIND ELECTRIC PLANT

[76] Inventors: Marcellus L. Jacobs; Paul R. Jacobs, both of Rte. 13, Box 722, Fort Myers, Fla. 33901

[21] Appl. No.: 645,832

[22] Filed: Dec. 31, 1975

Related U.S. Application Data

[63] Continuation-in-part of Ser. No. 624,281, Oct. 20, 1975, abandoned.

[51] Int. Cl.² .............................................. F03D 9/00
[52] U.S. Cl. ...................................... 290/55; 416/89; 416/135; 74/381
[58] Field of Search ....................... 290/55, 54, 44, 43; 416/89, 135, 136, 202; 74/381, 417

[56] References Cited

U.S. PATENT DOCUMENTS

| 1,266,518 | 5/1918 | Mulrony | 290/44 |
|---|---|---|---|
| 1,315,595 | 9/1919 | Clark | 290/44 |
| 1,589,828 | 6/1926 | Williams et al. | 290/44 |
| 1,666,361 | 4/1928 | Thompson | 290/55 |
| 2,376,020 | 5/1945 | Victoria | 290/44 |
| 2,505,969 | 5/1950 | Jacobs | 416/136 |
| 2,652,699 | 9/1953 | Romani | 290/55 |

FOREIGN PATENT DOCUMENTS

| 117,764 | 11/1943 | Australia | 290/44 |
|---|---|---|---|

*Primary Examiner*—Robert K. Schaefer
*Assistant Examiner*—Eugene S. Indyk
*Attorney, Agent, or Firm*—Shoemaker and Mattare, Ltd.

[57] ABSTRACT

A multiblade, wind-driven, variable pitch propeller is used in a wind electric plant for the generation of electrical power from wind forces, and the propeller is rotatable in a plane at an angle to the tower axis, enabling larger propellers to be used without propeller-tower interference and also reducing the distance between the propeller and gear case. A snubber arrangement is provided on the propeller blade return springs to slow the governor action and prevent abrupt pitch changes and damaging flutter of the blades, and a self-centering, double-acting pivot washer is provided between the propeller blades and the return springs to ensure free pivoting and long life of the spring connecting bolts. Adjustable positive blade stop bolts are engaged directly between the hub and the propeller blades to limit return movement thereof. The propeller hub-return spring connection includes a laterally movable spring bracket which enables the propeller blades to feather in the event one or more return springs is broken or otherwise rendered inoperative. The gear case center, ring gear and axis of propeller rotation are offset laterally from the axis of the tower and pinion gear, to balance torque forces generated at the gears with wind forces on the propeller.

23 Claims, 14 Drawing Figures

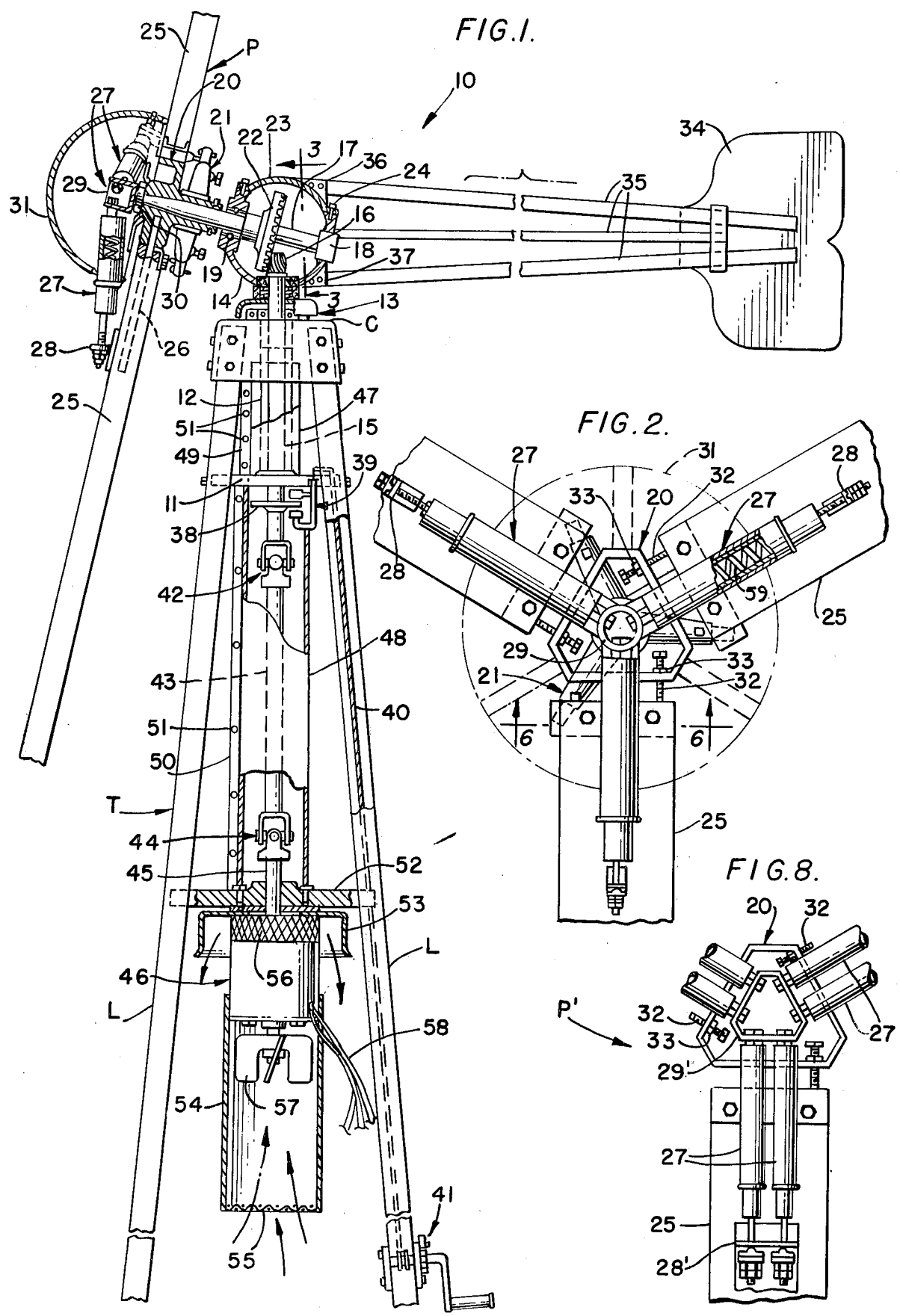

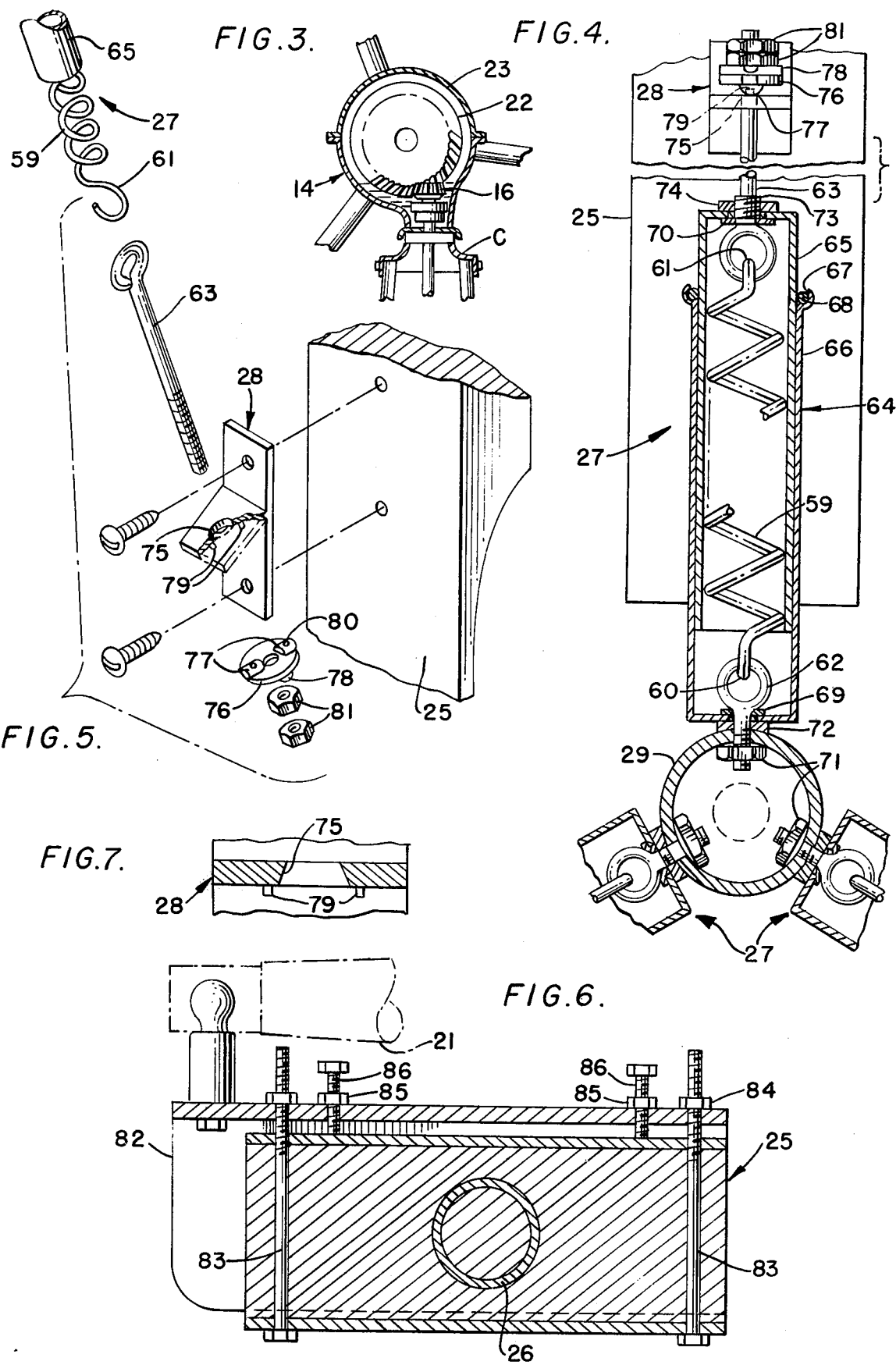

FIG. 9.
FIG. 10.
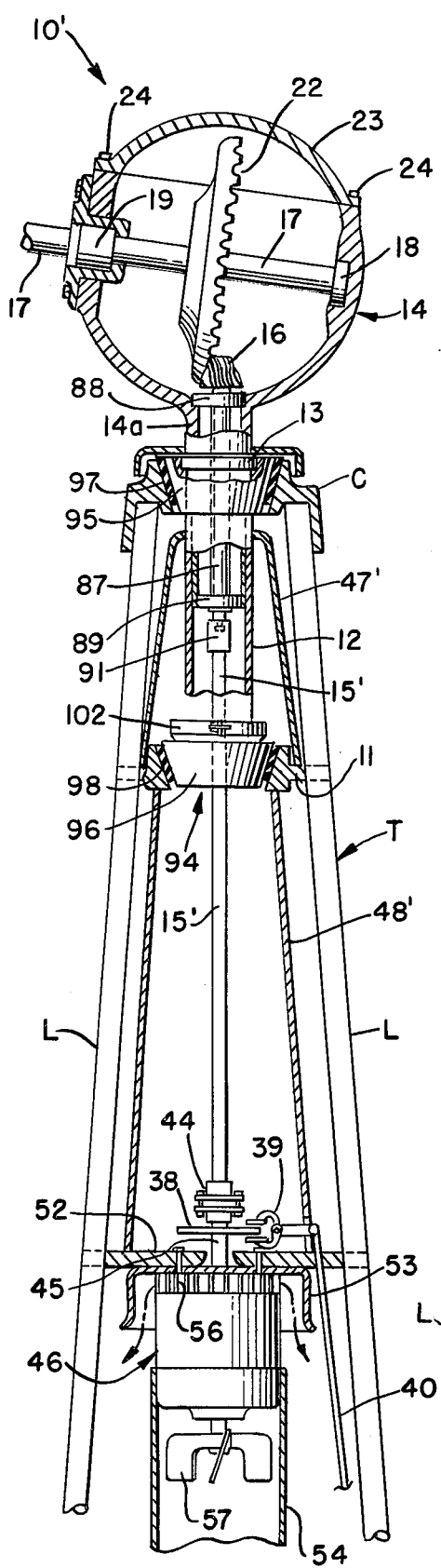
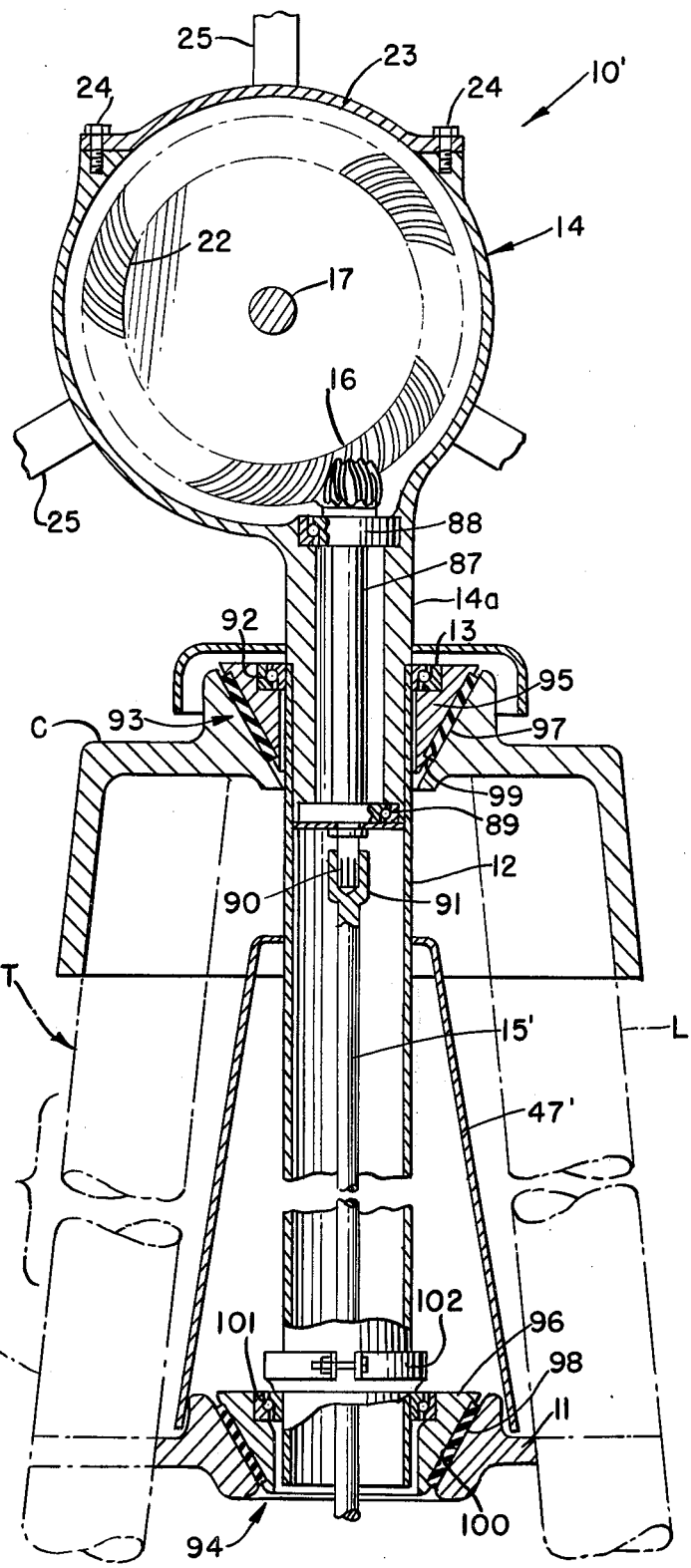

WIND ELECTRIC PLANT

BACKGROUND OF THE INVENTION

This application is a continuation-in-part of Application Ser. No. 624,281, filed Oct. 20, 1975 now abandoned.

This invention relates in general to a wind energy power system of the type using a multiblade propeller for producing power from wind energy. More particularly, the invention relates to a multiblade, wind-driven, variable pitch propeller supported at the top of a tower and connected through a gear arrangement for driving an output shaft supported on the tower. The output shaft may be connected to power a pump for pumping water, or for operating a compressor for refrigeration or other uses, or for the production of mechanical power for any desired use. Specifically, the invention relates to a system as above, wherein the propeller is used to drive an electric generator for the generation of electrical energy.

In the prior art, many different types of wind electric plants have been provided for generating electrical power from wind energy, as exemplified, for example, in U.S. Pat. Nos. 1,979,616, 2,050,142, 2,096,860, 2,464,234 and 2,505,969. Some of the wind electric plants disclosed in these prior art patents utilize variable pitch propeller blades, which are automatically governed or self-regulating for changing wind conditions. However, prior art wind electric plants typically have relatively small diameter propellers, as, for example, on the order of about 10 feet in diameter, and accordingly, the forces encountered are relatively small and easy to handle. For example, pitch adjusting structures and blade stop means can be accommodated through various parts of the governor structure, and pitch changes of the propeller blades can be accomplished at all operating speeds of the wind plants. Also, installation and service of such prior art systems is relatively easy to accomplish, since spring forces and propeller blade sizes and weights and the like are relatively small and thus easy to handle.

Recently, however, there has been increasing demand for larger propellers for production of greater amounts of horsepower and electrical energy output. Such larger propellers, for example, range upward to about 25 feet in diameter. At these propeller sizes, conventional structures and arrangements and pitch adjusting features are not capable of withstanding the loads encountered. Further, the propeller blades must be repositioned in order to afford adequate clearance thereof with the supporting tower. Moreover, it has been found that with these larger propeller blades, changes in pitch could not be effectively accomplished with conventional structures, and damage to the propeller blades results at higher wind velocities. Additionally, with the larger propellers, greater amounts of torque are encountered, and conventional spring arrangements are not capable of controlling the blade operation, and further, failure of the spring mounting bolts frequently occurs after a short period of use. Still further, conventional blade adjusting structures are not suitable for use with the larger propeller blades, and more direct attachment and engagement of the blade pitch adjusting bolts and blade return stop bolts is required.

Therefore, in accordance with the present invention, a unique wind electric plant is provided which is constructed to withstand the larger forces encountered when larger propellers are used, and means are provided to effectively solve all of the problems set forth above which are found with prior art devices.

OBJECTS OF THE INVENTION

It is, therefore, an object of this invention to provide a wind power plant of the type incorporating a multiblade, variable pitch propeller, wherein the propeller is supported on a tower with the plane of propeller rotation angularly disposed relative to the axis of the tower to thereby obtain adequate propeller blade-tower clearance, and also to enable the propeller hub to be mounted closely adjacent the gear drive connection on the tower for driving an electric generator or other suitable devices.

Another object of the invention is to provide a unique blade return spring construction, which has snubber means associated therewith for slowing the action of the spring and thus preventing excessively rapid pitch changes and thereby avoiding destructive flutter of the propeller blades during operation at high wind velocities.

A still further object of the invention is to provide a double spring arrangement for returning the blades to their stop position, whereby the return force of the springs can be combined to operate effectively with large propeller blades, and which also spread the force of the springs over a larger area of the propellers and hub structure to eliminate excessive forces which would be required if single springs were used, as in some prior art devices.

Yet another object of the invention is to provide a unique blade return spring mounting bracket associated with the hub in a manner such that in the event one or more of the springs breaks or the like, the bracket is automatically adjustable to permit all of the propeller blades to feather and thus prevent damage to the plant.

A still further object of the invention is to provide a direct engagement between the blade return stop bolt and the hub of the propeller, whereby damaging forces on the hub structure and/or other elements of the propeller blade control structure is avoided with the larger diameter propellers.

A still further object of the invention is to provide a unique self-centering, double-acting pivot washer for connection between the return spring and the blade mounting bracket, whereby accurate centering of the blade mounting bolt in the bracket hole is ensured, and bending forces on the bolt are also eliminated.

An even further object of the invention is to provide a wind electric plant in which the electric generator is supported at a lower position in the tower than in prior art devices for easier servicing thereof, and the generator is connected through a drive shaft arrangement with a ring and pinion gear carried at the top of the tower.

An even further object of the invention is to provide in a wind electric plant of the type having a wind-driven multiblade propeller supported at the top of a tower and connected through a gear arrangement for driving an electric generator, a ring and pinion gear set, wherein the ring gear is eccentrically disposed relative to the axis of the pinion gear, such that the torque forces imparted through the ring and pinion gear are at least partially balanced or offset by the wind forces acting on the propeller, to thus prevent misalignment of the propeller axis relative to the direction of prevailing wind forces.

An even further object of the invention is to provide a wind electric plant wherein the propeller thereof is disposed at an angle relative to the axis of the supporting tower, whereby the angle of attack of the propeller is actually more nearly pointed directly into the direction of prevailing wind forces.

Yet another object of the invention is to provide a wind electric plant of the type having a multiblade propeller and a gear means supported in a tower adjacent the propeller and driven thereby, and vibration damping means connected between the gear means and tower to reduce noise and vibration transmitted into the tower.

A still further object is to provide a wind electric plant of the type including a tower having propeller driven gear means supported thereon and a splined stub shaft extending downwardly therefrom for connection with a drive shaft, whereby the gear means, propeller, drive shaft and the like may be removed and/or serviced without requiring disassembly of the other components of the plant.

An even further object of the invention is to provide a wind electric plant of the type including a propeller driven gear means, wherein the gear means includes a ring gear and meshed hypoid bevel gear, wherein the bevel gear is engaged at the top of the ring gear so as to be positioned above oil in the gear case, to reduce friction losses, particularly in cold climates.

BRIEF DESCRIPTION OF THE DRAWINGS

FIG. 1 is a fragmentary view in elevation, with portions broken away and portions shown in section, of a wind electric plant incorporating the features of the present invention.

FIG. 2 is an enlarged, fragmentary front view of the portion of the propeller near the hub of the device in FIG. 1, with the hub cover or fairing cone shown in phantom lines for purposes of illustration.

FIG. 3 is a view in section taken along line 3—3 of FIG. 1 showing the offset of the ring and pinion gears.

FIG. 4 is a greatly enlarged, fragmentary view in section of one of the snubber devices of the invention and its association with a return spring and spring mounting bracket.

FIG. 5 is an exploded, perspective view, with portions broken away, of the connection of one of the return springs with the blade return spring bracket, and showing the self-centering, double-acting pivot washer associated therewith.

FIG. 6 is a greatly enlarged view in section, taken along line 6—6 in FIG. 2.

FIG. 7 is an enlarged view in section of a portion of the blade return spring bracket, showing the bolt receptive hole therethrough and the aligning pins thereon for cooperation with the pivot washer.

FIG. 8 is a fragmentary front view similar to FIG. 2 of a modified form of the invention, wherein double springs are used on each propeller blade.

FIG. 9 is a slightly enlarged view similar to FIG. 1 of a further modification of the invention, wherein a splined stub shaft and vibration dampers are used.

FIG. 10 is a further enlarged, fragmentary sectional view taken along line 10—10 of FIG. 9.

DETAILED DESCRIPTION OF THE PREFERRED EMBODIMENTS

Figure 11:
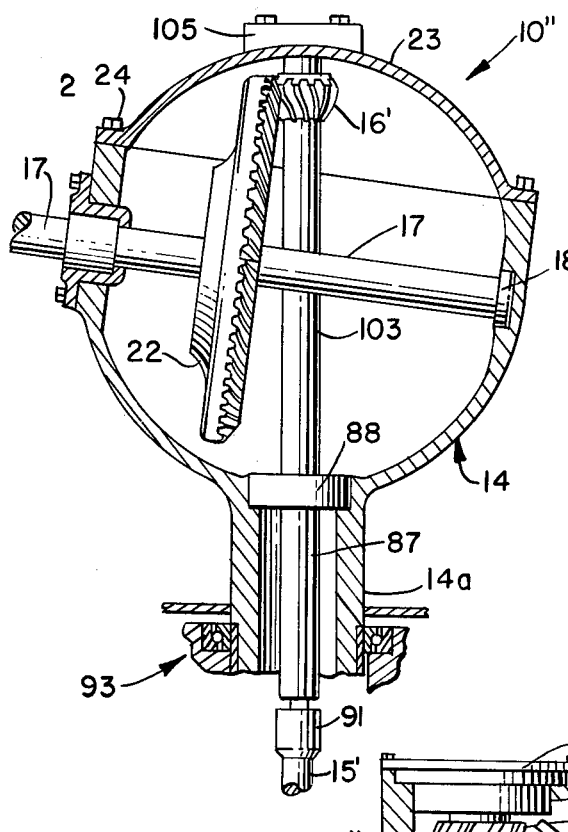
FIG. 11 is a view similar to FIG. 9 of a further modification of the invention, wherein the pinion or hypoid bevel gear is engaged near the top of the ring gear, and the ring gear rotates in a counterclockwise direction.

In the drawings, wherein like reference numerals indicate like parts throughout the several views, a first form of wind electric plant in accordance with the invention is indicated generally at 10 and comprises a support tower T on which a multiblade, variable pitch propeller P is supported.

The tower T is of substantially conventional construction, and includes a plurality of legs L converging toward one another at their upper ends and having a tower cap C secured thereon. A transverse plate 11 is suitably secured to the legs of the tower spaced downwardly from the tower cap C and an upstanding mast pipe 12 is suitably attached at its lower end to plate 11 and extends upwardly therefrom through the tower cap C and through a turn bearing 13. A gear case 14 has an extension 14a thereon which extends downwardly into the upper end of the mast pipe to support the gear case on the top of the tower. In other words, the plate 11 is rigidly and securely fixed to the tower, and the mast pipe is attached at its lower end to the plate 11 and connected at its upper end to the case 14, so that the case is supported on the tower for rotating movement about the axis of the tower, but is prevented from lateral displacement relative thereto.

A drive shaft 15 extends coaxially within the mast pipe 12 and is rotatable relative thereto and extends upwardly at its upper end through the upper end of the mast pipe and into the interior of the gear case 14 and has a pinion gear or hypoid bevel gear 16 affixed thereto. A propeller shaft 17 extends through the gear case 14 and is inclined to the axis of the tower (about 9° from the horizontal in a preferred form) and offset laterally to one side of the axis of drive shaft 15, as seen in FIG. 3. The propeller 17 is supported in bearings 18 an 19 in the rear and front walls, respectively, of the gear case 14, and extends forwardly of the gear case and has a propeller hub 20 secured thereon and an automatic, pitch adjusting governor arrangement 21 of the type disclosed, for example, in U.S. Pat. No. 2,505,969 or co-pending Application Ser. No. 477,316, is supported. A ring gear 22 is carried by the shaft 17 within the case 14 in operative engagement with the pinion gear 16 for driving the pinion gear whenever the propeller shaft is rotated by the propeller P. A gear case cover 23 is removably attached to the top of the gear case for gaining access to the interior thereof when desired or necessary, and the cover is secured in place by removable fasteners 24, such as stud bolts or the like.

The propeller P comprises a plurality of blades 25 carried by the hub in a manner as described, for example, in the aforesaid patent and co-pending application. Briefly, the propellers 25 are radially slidable on rods 26 secured to the hub and received in cooperating bores in the butt ends of the propeller blades, and the propeller blades are urged radially inwardly on the rods toward the hub 20 by means of return spring structures 27 secured to brackets 28 on the propeller blades and secured to a spring bracket 29 engaged against the hub nut 30 on the forward end of the propeller shaft. The spring bracket is generally cup-shaped, with the open side thereof facing forwardly so that access can be had to the nuts on the spring attaching bolts. A rounded or streamlined fairing cone or cover 31 is supported on the hub in covering relationship to the return springs and bracket 29.

In order to limit the inward movement of the propeller blades on the rods 26, threaded adjustment bolts 32 are threadably extended through the hub 20 into engagement with the butt end of the blades, and lock nuts 33 are engaged on the bolts 32 to lock them in adjusted position. With this arrangement, accurate and easy adjustment of the inward movement of the blades can be easily accomplished to accurately adjust all of the blades to any given hub casting or the like. In other words, in some prior art structures for adjusting the stop position of the propeller blades, the adjustment is made through a linkage arrangement which may be suitable for smaller diameter propellers, but for large diameter propellers as contemplated by the present invention, such adjustments are entirely unsatisfactory.

In order to maintain the propeller properly pointed into the wind, a tail vane 34 is supported from the gear case by a plurality of tail vane braces 35 connected at their rearward ends to the vane 34 and secured at their forward ends to upper and lower brackets 36 and 37, respectively, and to a side bracket (not shown) on the gear case 14.

In the form of the invention shown in FIG. 1, the drive shaft 15 extends downwardly from the pinion gear 16 through the mast pipe 12 and through the plate 11 and has a disc brake rotor 38 secured thereto below the plate 11 for cooperation with disc brake calipers 39 carried by the tower. A cable 40 extends downwardly from the disc brake calipers 39 to a winch 41 near the bottom of the tower, whereby the disc brake calipers may be operated to grip the disc brake rotor 38 to stop rotation of the propeller when desired. Rather than the cable and winch as illustrated and described, any other suitable mechanism may be provided for operating the brake to stop the propeller. For example, a hydraulic system could be used.

A universal joint 42 is carried by the lower end of the drive shaft 15 and is connected with a drive shaft extension 43 having a second universal joint 44 at its lower end, which is connected in turn with the shaft 45 of a suitable electric generator 46 for operating the generator to generate electrical power.

Suitable weather shields 47 and 48, similar to split stovepipes or the like, are positioned around the drive shafts 15 and 43 in protective relationship with the drive shafts, disc brake assembly and universal joints, and the shields have longitudinal flanges 49 and 50 thereon, respectively, through which suitable fasteners 51 extend for securing the shields in place around the drive shafts.

The generator 46 is supported from a second transverse plate 52 carried by the tower, and the generator shaft 45 extends through the plate 52.

An inverted, cup-shaped weather shield 53 is supported beneath the plate 52 above the generator 46 for shielding the generator from weather and the like.

An elongate, tubular shield or chimney 54 is secured to the generator 46 and extends downwardly therefrom and has a screened lower end 55 for ingress of air into the tube 54 and flow upwardly through the tube and through the generator and outwardly through a screened grill 56 at the upper end of the generator for cooling the generator. An air circulating fan 57 is driven by the generator for forcing air upwardly through the chimney or tube 54 and through the generator to cool it.

Electrical cables 58 extend from the generator downwardly to the ground for conducting electrical energy to a suitable point of use.

If desired, the generator 46 may be of the type which does not require an exciter, as described in co-pending Application Ser. No. 477,316.

As seen best in FIGS. 4 and 5, the spring assemblies 27 each comprise an elongate coil spring 59 having hook-shaped formations 60 and 61 at the opposite ends thereof engaged with eye bolts 62 and 63. A snubber 64 is positioned coaxially around the coil spring 59 and comprises a pair of elongate tubular members 65 and 66 telescopically engaged with one another and slidably sealed by means of an O-ring 67 positioned in an enlarged seal pocket 68 in one end of the housing portion 66. The eye bolts 62 and 63 extend through openings in the outer ends of the housing portions 65 and 66 and are sealed relative thereto by means of gaskets 69 and 70. The eye bolt 62 extends through the wall of the spring bracket 29 and is secured thereto by means of a nut 71. A washer 72 is engaged between the wall of bracket 29 and the end of housing member or portion 66. The other eye bolt 63 has an enlarged threaded portion 73 thereon, on which a nut 74 is engaged to secure the eye bolt to the end of housing member 65. Eye bolt 63 extends beyond the threaded portion 73 and through a flared opening 75 in the bracket 28. A self-aligning pivot washer 76 is positioned over the end of the bolt 63 projecting through the bracket 28. The washer 76 is of solid construction and has upstanding ribs 77 on one side thereof and similar upstanding ribs 78 on the other side thereof extending at a right angle to the axis of ribs 77. Further, a pair of upstanding centering pins 79 are on the bracket 28 on opposite sides of the flared hole 75 and the pins 79 extend into a pair of aligned openings 80 in the ribs 77 on the underside of washer 76, whereby the washer is accurately positioned and centered relative to the hole 75. A pair of retaining nuts 81 are threaded onto the end of bolt 63 against washer 76 to tension the spring 59 and effect the desired inward bias on the propeller blade.

In use, the snubber 64 acts much like a shock absorber to prevent rapid changes in pitch of the propeller blade due to the momentum effect caused by the weight of the larger propeller blades, and thus hunting and flutter of the propeller blades is prevented.

The butt ends of the blades 25 are adjustably fixed to an angle bracket 82, through one flange of which the rod 26 extends and through the other flange of which a plurality of blade attaching bolts 83 extend. The initial pitch of the blades may be adjusted with a high degree of accuracy by loosening nuts 84 on bolts 83 and loosening nuts 85 on pitch adjusting bolts 86 and then adjusting the bolts 86 inwardly or outwardly as necessary and retightening the nuts 84 and 85.

With the arrangement shown in FIG. 6, adjustment of the pitch of the blades is easily accomplished and there is little problem of not being able to adjust the blades due to rusting of the bolts and the like, as frequently occurs with prior art blade adjusting devices.

A modified propeller arrangement is indicated generally at P' in FIG. 8, and is substantially identical with the form of the invention illustrated in FIGS. 1–7, except that in this instance, for very large propellers a pair of spring assemblies 27 are provided for each blade, rather than the single spring assemblies as in the previous embodiment. A wider spring attaching bracket 28' is carried by each propeller blade, such that the force exerted by the springs is distributed over a larger area of the propeller blades, thus reducing the stresses imposed thereon from the spring force. Also, a modified spring attaching bracket 29' is disposed against the end of the hub for interconnection of the spring assemblies 27, and as seen in FIG. 8, the modified spring attaching bracket 29' is generally of triangular shape.

Propeller blades in accordance with the present invention may range upwardly of about 25 feet in diameter, and thus very large forces are created, and in fact, the spring force necessary to properly control such large propeller blades may approach or even exceed 4,000 pounds. Accordingly, the unsuitability of conventional structures is readily apparent. Additionally, with the large propeller sizes contemplated by the present invention, most of the problems encountered in wind electric plants are magnified in comparison with conventional prior art arrangements, and in fact, the offset arrangement of the ring and pinion gear, as shown in FIG. 3, is necessary in order to effect a balance between the torque forces generated between the ring and pinion gears and the wind forces imposed on the propeller. In other words, the propeller blades used in apparatus like the present invention are highly efficient, and very little wind force is present behind the propeller, with the result that the tail vane 34 has little appreciable effect until a high angular displacement occurs. With the present invention, the apparatus, when using a propeller having a diameter of about 20 feet, is capable of generating about 20 horsepower, and accordingly, the torque forces between the ring and pinion gears are quite large, with the result that the propeller or ring gear tends to "walk" or precess around the pinion gear, thus effecting a misalignment or improper angle of attack of the propeller relative to the wind direction. The offset as shown in FIG. 3 effectively and efficiently solves this problem, since the wind force on the large propeller imparts a moment or torque in a direction opposite that of the torque created between the ring and pinion gears, with the result that the tendency of the ring gear to walk around the pinion gear is offset or balanced. Further, on propellers of the size contemplated by the present invention, there is a problem of flutter of the propeller tips during rapid pitch changes, with the result that the propeller blades are destroyed. This is apparent when it is considered that at the higher wind velocities the propeller tips are traveling well over 150 miles per hour, and during a rapid pitch change, the air foil effect is disrupted, causing flutter or hunting of the propeller tips. The snubbers 64 on the spring assemblies 27 according to the invention effectively solve this problem.

A modified wind electric plant 10' is illustrated in FIGS. 9 and 10, and is substantially the same as previously described, except that a drive shaft means includes a short, splined stub shaft 87 extending downwardly from the hypoid bevel gear 16 through the case extension 14a, and rotatably supported at its upper end by a bearing 88 and at its lower end by a bearing 89. The splined end 90 of the stub shaft projects downwardly below the lower end of the case extension 14a, and is received in a mating, grooved socket 91 on the upper end of drive shaft 15'. As seen in FIG. 10, the extension 14a has a shoulder 92 thereon which engages the upper end of mast pipe 12, to support the case 14 as shown.

This splined connection enables the stub shaft 87 and drive shaft 15' to be separated from one another for service on the respective associated parts without requiring disassembly of all of the elements.

Noise reducing and vibration damping means 93 and 94 are engaged between the mast pipe 12 and tower T. The damping means comprises identical, interchangeable, tubular, frusto-conically shaped cast spacers 95 and 96 at the upper and lower ends, respectively, of the mast pipe 12, each having a cylindrical bore therethrough and a conical outer surface, with suitable resilient means 97 and 98, such as rubber or the like, carried thereby and supporting the spacers in spaced relation to the complemental support surfaces 99 and 100 on the cap C and plate 11, respectively. A bearing 101 is engaged between the mast pipe 12 and spacer 96 of lower damping means 94, and a suitable clamp 102 is secured on the mast pipe and engaged against the bearing 101 to hold the bearing 101 and damping means 94 securely engaged.

In one construction of the invention, the ring gear has a diameter of about 15 inches and there is a 6:1 ratio between the ring gear and hypoid bevel gear.

Also, in the form of the invention illustrated in FIGS. 9 and 10, the weather shields 47' and 48' are generally conically shaped and are made of aluminum, or other suitable material.

Figure 12:
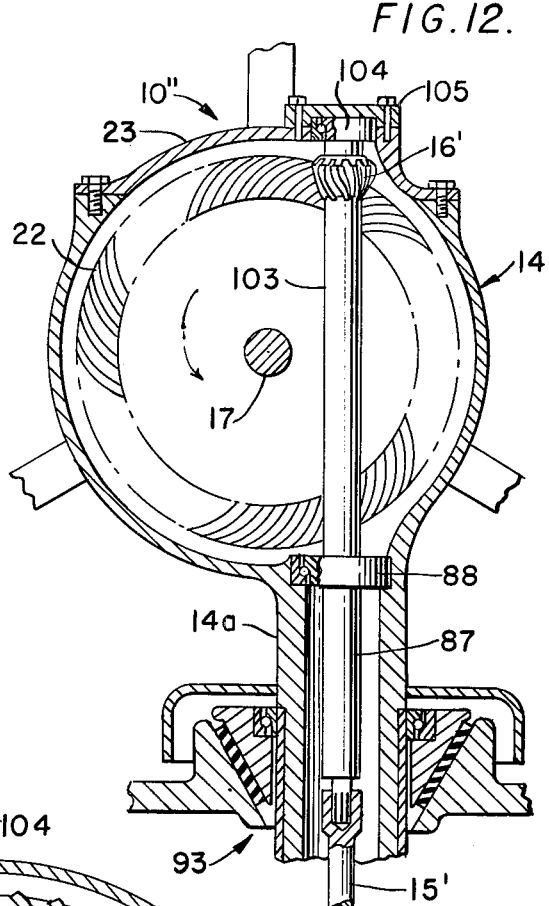
FIG. 12 is a view similar to FIG. 10 of the form of the invention in FIG. 11.

In FIGS. 11 and 12, a further modification of the wind electric plant is indicated generally at 10", and in this form of the invention the gear means and gear case and the like are subtantially similar to that illustrated and described with reference to FIGS. 9 and 10, except that an extended pinion shaft 103 projects upwardly through the gear case and the pinion gear or hypoid bevel gear 16' is engaged with the ring gear 22 adjacent the upper portion thereof. The upper end of pinion shaft 103 is supported in a bearing means 104 and a bearing cap 105 is secured on the cover 23 of gear case 14 for supporting the bearing means 104.

In connection with this form of the invention, there are some applications for wind electric plants in cold climates, and in such uses, the oil or lubricating fluid used in the gear case becomes quite stiff and, therefore, relatively large frictional drag is encountered upon movement of the gears in the cold lubricating fluid. The largest frictional drag is encountered by the pinion or hypoid bevel gear 16', since it rotates at a much higher speed than the ring gear. In fact, movement of the ring gear does not present a very great problem, since it moves relatively slowly. The ring gear carries ample lubricant with it to the pinion gear to lubricate the same, even through it is positioned above the lubricating fluid, as illustrated in these figures. Further, it should be noted in these figures, and particularly in FIG. 12, that the pinion gear and the pinion shaft are located to the right of the axis of the propeller shaft 17. This arrangement would be utilized, for example, in the event the propeller and ring gear are required to rotate counterclockwise for driving various equipment, and the torque forces between the ring gear and pinion gear are then balanced by the wind forces on the propeller.

Figure 13:
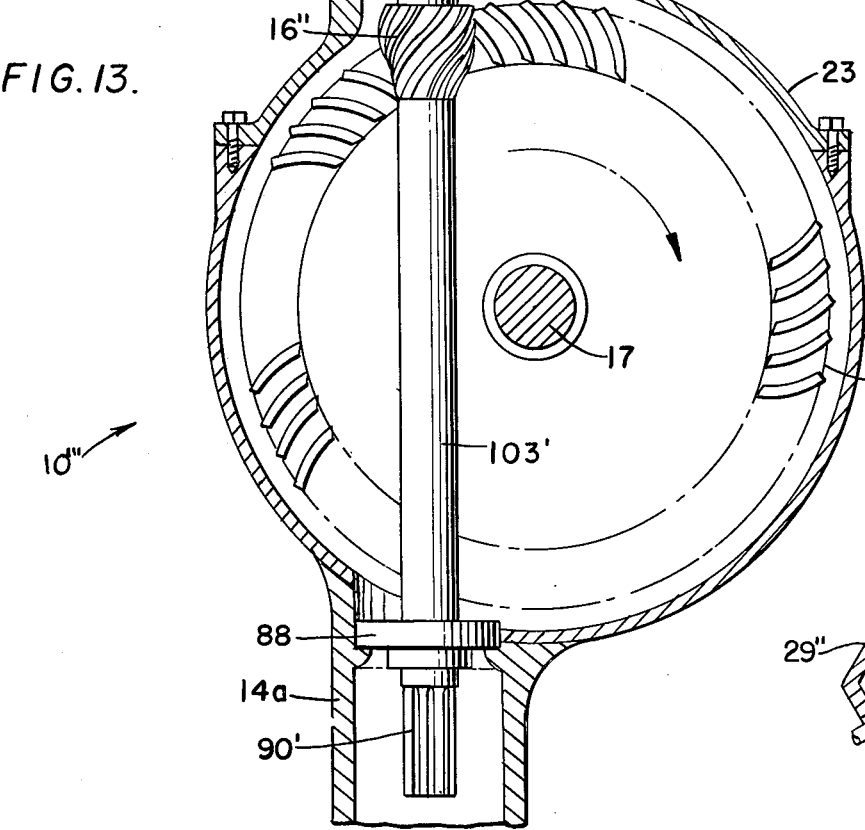
FIG. 13 is a fragmentary, enlarged view in section similar to FIG. 12, of a further modification of the invention, for clockwise rotation of the ring gear.

A still further modification of wind electric plants is indicated generally at 10''' in FIG. 13, and this form of the invention is substantially identical with that illustrated and described in relation to FIGS. 11 and 12, except that the axis of the extended pinion shaft 103' is positioned to the left of the ring gear shaft 17 when viewed from the rear, as in FIG. 13, and the hypoid bevel gear 16" engages the ring gear near the top thereof, as before, and for substantially the same reasons. However, this form of the invention is intended for applications in which the propeller and ring gear are required to rotate in a clockwise direction in order to obtain balance between the torque forces created between the ring gear and pinion gear and the wind forces acting on the propeller. Further, in this form of the invention the splined shaft is much shorter and the splined end 90' of the pinion shaft is actually positioned closely adjacent the bearing 88 at the bottom of the gear case 14.

Figure 14:
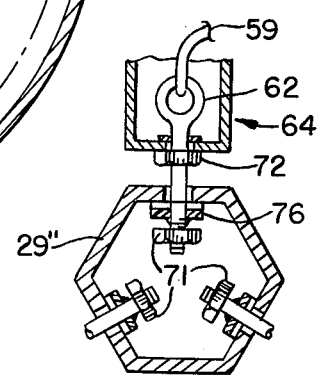
FIG. 14 is an enlarged, fragmentary view in elevation of a modified connection between the snubber springs and spring bracket.

In FIG. 14, a further modification of the spring bracket 29" for connecting the inner end of the snubber springs 59 includes a generally cup-shaped, hexagonal bracket 29", having holes through the sides thereof through which the eye bolts 62 extend, and pivot washers 76 identical to those used at the outer ends of the snubber springs are engaged between the nuts 71 and the adjacent inner surfaces of the spring bracket 29'.

Although not illustrated, this same pivot washer structure may be utilized with the double-spring arrangement of FIG. 8, if desired.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A wind electric plant of the type including a support tower and a multiblade, variable pitch propeller supported thereon, the improvement comprising: gear means supported on top of the tower; a propeller shaft connected to the gear means and extending forwardly therefrom at an upwardly inclined angle to horizontal and thus angularly inclined relative to the axis of the tower; multiblade, variable pitch propeller means carried on the propeller shaft upwind of the support tower for rotation in a plane angularly disposed relative to the axis of the tower and disposed substantially perpendicularly to the direction of the wind, thereby obtaining clearance between the propeller and tower and also disposing the propeller at a favorable angle of attack relative to wind direction; and a drive shaft connected at an upper end thereof to the gear means to be driven thereby and extending downwardly in the tower, said gear means connected said propeller shaft with said drive shaft such that said propeller shaft axis is laterally offset from the axis of the drive shaft, whereby said propeller is eccentrically located relative to the tower axis such that torque forces created in the gear means are offset by wind forces acting on the propeller, to prevent precession of the propeller about the tower axis.

2. A wind electric plant as in claim 1, wherein said gear means includes a ring gear and a hypoid bevel gear meshed therewith, one of said gears carried on the upper end of the drive shaft and the other of said gears carried on the propeller shaft.

3. A wind electric plant as in claim 1, wherein said drive shaft includes a stub shaft connected at an upper end thereof with the gear means and having spline means on a lower end thereof, and a drive shaft extension having spline means on an upper end thereof connected to the stub shaft spline means and extending downwardly therefrom, said stub shaft and drive shaft extension being readily separable from one another for service and the like without requiring disassembly of all of the related components.

4. A wind electric plant as in claim 1, wherein each propeller blade is mounted for radial outward and inward movement relative to the propeller shaft, spring means connected with the blades to move them radially inwardly, spring connecting means connecting the spring means to the propeller blades, said spring connecting means including bracket means on the propeller blades, bolt means connected with the spring means and with the bracket means, and a self-centering pivot washer engaged between the spring means and bracket means to center the bolt means relative to the bracket means and to enable the bolt means to pivot relative to said bracket means during pitch changes and the like.

5. A wind electric plant as in claim 1, wherein the propeller blades are mounted on a propeller hub for radial movement outwardly under centrifugal force, and a pair of return springs connected between each blade and the hub to return the blades radially inwardly.

6. A wind electric plant as in claim 5, wherein pitch change means are connected with the blades to change the pitch thereof upon radial inward and outward movement, and snubber means concentrically disposed on each of the return springs to slow the speed of pitch changes and thus avoid flutter and hunting of the propeller blades at high propeller tip speeds.

7. A wind electric plant as in claim 6, wherein the snubber means comprises a pair of telescopically inter-engaged tubular members concentrically disposed on the springs and having sliding seal means operatively engaged therebetween, whereby as the spring contracts and expands, the telescopically engaged tubular members are slidably moved relative to one another to dampen the speed of expansion and contraction of the springs.

8. A wind electric plant as in claim 1, wherein a disc brake assembly is carried by the drive shaft at a position spaced downwardly from the upper end of the tower and operating means is connected with the disc brake assembly to operate the disc brake to stop rotation of the propeller when desired.

9. A wind electric plant as in claim 8, wherein a tubular weather shield is removably positioned around the drive shaft and disc brake assembly in coaxial relationship therewith to shield the same from the weather.

10. A wind electric plant as in claim 1, wherein noise reducing and vibration damping means is connected between the gear means and tower to reduce transmission of noise and vibration from the gear means into the tower.

11. A wind power plant of the type including a support tower and a multiblade, variable pitch propeller supported thereon, the improvement comprising: gear means supported on top of the tower; a propeller shaft connected to the gear means and extending forwardly therefrom; multiblade, variable pitch propeller means carried on the propeller shaft; and drive shaft means connected with the gear means and extending downwardly in the tower for connection to suitable means to be driven by the drive shaft means; said gear means including a ring gear carried by the propeller shaft, and a hypoid bevel gear carried by the drive shaft means and meshed with the ring gear, said drive shaft means disposed with its axis offset to one side of the axis of the propeller shaft so that wind forces on the propeller means tending to push the propeller means around the axis of the tower are balanced by torque forces between the ring gear and bevel gear.

12. A wind power plant as in claim 11, wherein the axis of the drive shaft means is positioned to the right of the axis of the propeller shaft, when viewed from the rear of the tower.

13. A wind power plant as in claim 12, wherein the bevel gear is engaged with the ring gear adjacent the top thereof.

14. A wind power plant as in claim 12, wherein the bevel gear is engaged with the ring gear adjacent the bottom thereof.

15. A wind power plant as in claim 11, wherein the axis of the drive shaft means is positioned to the left of the axis of the propeller shaft, when viewed from the rear of the tower.

16. A wind power plant as in claim 15, wherein the bevel gear is engaged with the ring gear adjacent the top thereof.

17. A wind electric plant of the type including a support tower and a multiblade, variable pitch propeller supported thereon, the improvement comprising: gear means supported on top of the tower; a propeller shaft connected to the gear means and extending forwardly therefrom; a plurality of variable pitch propeller blades carried on the propeller shaft for rotation in a plane angularly disposed relative to the axis of the tower, said propeller blades mounted on a propeller hub for radial movement outwardly under centrifugal force, a return spring connected between each blade and the hub to return the blades radially inwardly, pitch change means connected with the blades to change the pitch thereof upon radial inward and outward movement, and snubber means concentrically disposed on the return springs to slow the speed of pitch changes and thus avoid flutter and hunting of the propeller blades at high propeller tip speeds.

18. A wind electric plant as in claim 17, wherein the snubber means comprises a pair of telescopically interengaged tubular members concentrically disposed on the springs and having sliding seal means operatively engaged therebetween, whereby as the spring contracts and expands, the telescopically engaged tubular members are slidably moved relative to one another to dampen the speed of expansion and contraction of the springs.

19. A wind electric plant as in claim 17, wherein noise reducing and vibration damping means is connected between the gear means and tower to reduce transmission of noise and vibration from the gear means into the tower.

20. A wind electric plant as in claim 19, wherein the gear means includes a gear case, a ring gear and hypoid bevel gear meshed therewith in the case, a stub shaft connected with the bevel gear, said case having a downwardly projecting extension thereon, a mast pipe rotatably secured on the tower, said gear case extension received in the mast pipe and rotatable therewith, and said noise reducing and vibration damping means engaged between the mast pipe and tower at upper and lower end portions of the mast pipe.

21. A wind electric plant as in claim 20, wherein the damping means comprises a generally frusto-conical spacer having a cylindrical bore therethrough and a conical outer surface, an annular, resilient, vibration damping member carried on the outer surface, and engaged between the spacer and a complemental support surface.

22. A wind electric plant of the type including a support tower and a multiblade, variable pitch propeller supported thereon, the improvement comprising: gear means supported on top of the tower; a propeller shaft connected to the gear means and extending forwardly therefrom; a plurality of variable pitch propeller blades carried on the propeller shaft for rotation in a plane angularly disposed relative to the axis of the tower, said propeller blades mounted on a propeller hub for radial outward movement under centrifugal force, spring means connected between the blades and the propeller hub to move the blades radially inwardly, spring connecting means connecting the spring means to the propeller blades, said spring connecting means including a bracket means secured to the blades, bolt means connected with the bracket means and with the spring means, and self-centering pivot washer means engaged between the bolt means and bracket means to center the bolt means relative to the bracket means and to enable the bolt means to pivot relative to the bracket means during pitch changes and the like, said bracket means including a flange having a hole therethrough, said bolt means extending through said hole, said pivot washer engaged against said flange coaxial with said hole, a pair of centering pins on said flange on diametrically opposite sides of said hole, a pair of sockets in said washer in which said pins are received, and upstanding, diametrically extending ribs on each face of said washer, the ribs on one face extending perpendicular to the ribs on the other face.

23. A wind electric plant of the type including a support tower and a multiblade, variable pitch propeller supported thereon, the improvement comprising: gear means supported on top of the tower; a propeller shaft connected to the gear means and extending forwardly therefrom; a plurality of variable pitch propeller blades carried on the propeller shaft for rotation in a plane angularly disposed relative to the axis of the tower, said propeller blades mounted on a propeller hub for radial movement outwardly under centrifugal force, return spring means connected between each blade and the hub to return the blades radially inwardly, each blade having a butt end disposed adjacent the hub, and a stop bolt threadedly extended through the hub and projecting radially outwardly into a position to be engaged by the butt end of the blade at the radially innermost travel of the blade, to thereby enable adjustment of the limit of innermost travel of the blade under the action of the springs.

* * * * *